F. J. BALLWEG.
AUTOMOBILE AXLE.
APPLICATION FILED JAN. 30, 1913.
1,227,029. Patented May 22, 1917.
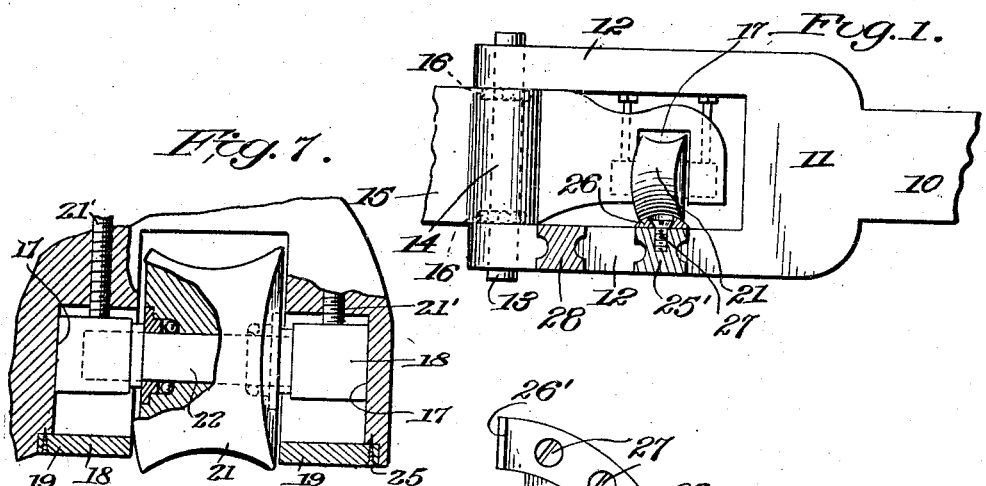
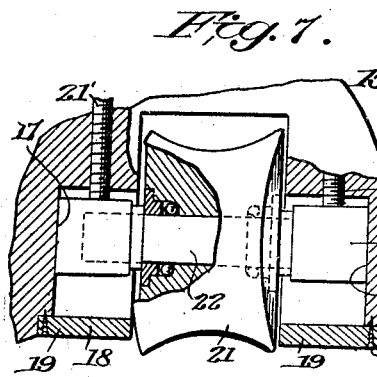
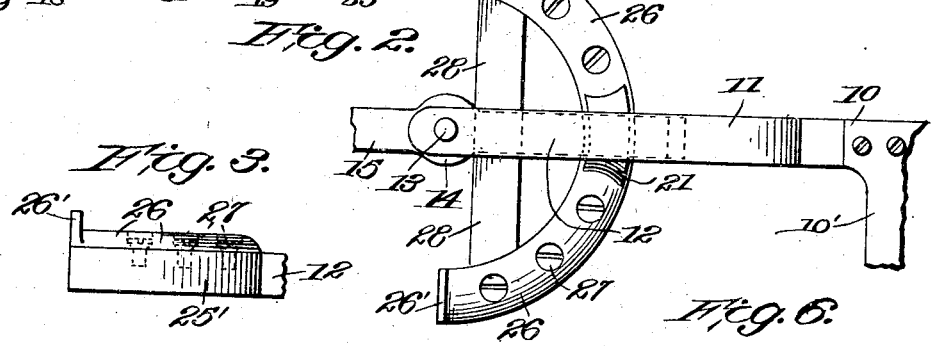
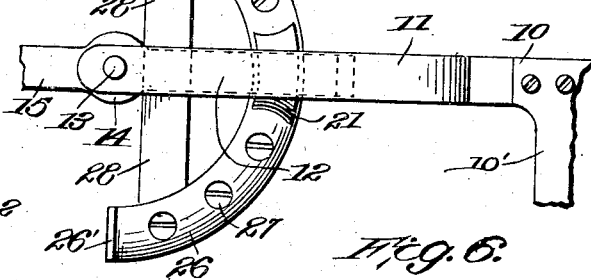
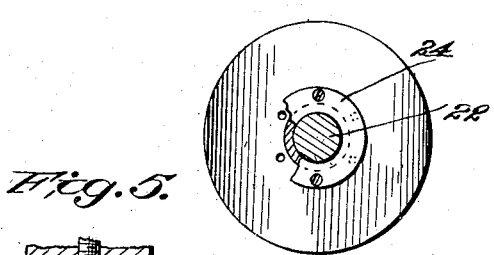
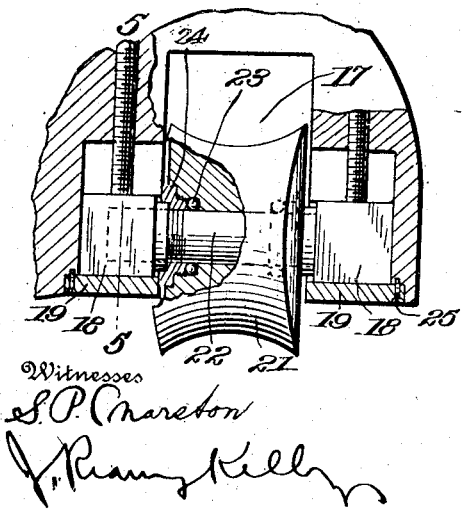

UNITED STATES PATENT OFFICE.

FRANK JAMES BALLWEG, OF MOBILE, ALABAMA.

AUTOMOBILE-AXLE.

1,227,029.  Specification of Letters Patent.  Patented May 22, 1917.

Application filed January 30, 1913. Serial No. 745,242.

*To all whom it may concern:*

Be it known that I, FRANK JAMES BALLWEG, a citizen of the United States, residing at Mobile, in the county of Mobile and State of Alabama, have invented new and useful Improvements in Automobile-Axles, of which the following is a specification.

The present invention relates broadly to the class of axles and more particularly to an axle especially used in connection with automobiles and other motor driven vehicles.

An object of my invention is to provide an axle whereby the wheels supporting the same may be adjusted to different angles in relation thereto.

Another object of my invention is to provide an axle wherein the wheels supporting the same may be adjusted to different angles independent thereof, and means for eliminating the friction generated by such an operation.

A further object of my invention is to provide an axle supporting an auxiliary axle at its extremity, the latter carrying the supporting wheels of the device. By this arrangement it is recognized that the auxiliary axles may be adjusted to different angles in relation to the main axle, especially in view of the fact that means have been provided for eliminating friction between the axles.

A still further object of my invention is to provide a device of the above mentioned character which consists of but a few simple parts whereby it may be manufactured and placed upon the market at a minimum cost.

With the above and other objects in view my invention relates to such details of construction and in the arrangement and combination of parts as will be hereinafter fully described and specifically pointed out in the appended claims.

In describing my invention in detail, reference will be had to the accompanying drawings wherein like characters denote like or corresponding parts throughout the several views and in which;

Figure 1 is a fragmentary view of the main axle illustrating the subordinate or auxiliary axle in pivotal engagement therewith.

Fig. 2 is a plan view of my invention as illustrated in Fig. 1.

Fig. 3 is a side elevation of a semi-circular guide track provided and used in connection with the auxiliary axle as will be hereinafter set forth.

Fig. 4 is a fragmentary view of a portion of the auxiliary axle illustrating means for supporting a friction pulley therein, the latter operating upon the guide track above mentioned.

Fig. 5 is a sectional view of a portion of the auxiliary axle illustrating an improved bearing which I have provided.

Fig. 6 is a side elevation of the friction pulley above mentioned.

Fig. 7 is a fragmentary view of a portion of the auxiliary axle, illustrating means for supporting the friction roller in its uppermost position therein.

In the accompanying drawings wherein is illustrated the preferred form of my invention the numeral 10 designates the body portion of the main axle which is enlarged at its extremity as shown at 11 to form a pair of longitudinally parallel extensions 12. Upon reference to Fig. 1 it will be seen that the axle and extensions are formed integral, thus allowing the entire main portion to be formed of a single sheet of material, consequently reducing the cost of manufacture of the device to a material extent. I am not limited to the material used in the formation of the axle, yet metal such as steel or cast iron has proven very efficient and may be used if desired.

The axle 10 as shown is provided with an angular extending finger portion 10', which when in operation has connection with certain subsidiary elements co-acting with the steering mechanism of the machine. By this arrangement positive actuation of the front wheels of the machine is attained, thus obviously assuring the efficiency of the device.

A pin 13 is journaled through the extensions 12, near their outer extremities, the pin pivotally supporting, through the medium of a sleeve 14, a subordinate axle 15. Here it will be recognized that the sleeve referred to is formed as an enlargement upon the subordinate axle, thus the same may be formed integral therewith. A portion of the sleeve is also cut away to receive a plurality of ball bearings 16 for the purpose of eliminating the friction which would be generated between the sections and the subordinate axle during the manipulation of the latter.

Like the main axle, the subordinate axle is constructed preferably of steel or cast iron, but it is apparent that I am not limited to this, and other forms of material may be substituted if occasion requires.

As is usually the case the subordinate axle supports at its forward extremity an ordinary automobile wheel (not shown).

The rear end of the subordinate axle is slightly reduced as will be apparent upon reference to Fig. 1, and has a cut-out portion 17 formed therein which communicates with its under faces. As is clearly shown a pair of bearing blocks 18 are supported adjacent the cut-out portion as shown in Fig. 4, the bearing blocks being prevented from having accidental displacement through the medium of plates 19, the latter being held in engagement with the auxiliary axle by suitable fastening devices 25. A friction pulley 21 is further provided, which is supported partly within the cut-out portion 17 through the medium of a transverse pintle 22, the ends of the latter being supported in the blocks 18, as is clearly apparent upon reference to Fig. 5. Cut-out portions are provided centrally within the pulley which receive ball bearings 23, the latter being held in place by packing nuts 24. By the provision of the ball bearings within the pulley, and in engagement with the pintle it will be recognized that the friction which would be generated between the pulley and the pintle is lessened.

In order to maintain the roller 21 in contact with the track and thus maintain the parts in an efficient relationship after they have become worn, I have vertically arranged bolts 21' in spaced relation adjacent the inner end of the subordinate axle, the bolts being threaded through the upper edge of the axle so that their free inner ends may engage one of the blocks 18. By this arrangement it can be seen that by operating the bolts and the blocks 18 which are slidably mounted in the cut-out portions 17 and which incidentally form a means for facilitating the rotatable revoluble mounting of the wheel, the latter may be at all times maintained in contact with a track.

Here particular reference is called to the construction of the friction pulley 21. In plan view the pulley is curved to assume a position substantially semi-circular, thus enabling it to be received upon and operate freely on a correspondingly curved guide provided therefor. A pulley constructed in this manner is essential to the efficient operation of my invention, and therefore the greatest of stress is laid thereon.

Consistent with the foregoing remarks, a substantially semi-circular guide supporting member 25' is provided which is disposed horizontally and adjacent the lower of the extensions 12. A correspondingly curved friction plate 26 is provided upon the guide as illustrated, the latter being held in place through the medium of a plurality of counter-sunk screws 27 thus assuring its rigidity.

Transverse supporting arms 28 are also provided, the same having connection with the guide 25' near its extremities and with the lower of the extensions 12 as shown. This particular supporting means for the guide has proven very efficient and is therefore usually employed, but it is to be recognized that other forms may be used if desired.

The operation of my invention is readily recognized in view of the foregoing disclosure. The subordinate axle being actuated by the operator, moves the sleeve 14 about the supporting structure and the pulley 21 about the guide plate 26. The friction generated between the subordinate axle and the main axle is decreased, thus greatly adding to the efficiency of my invention.

Such changes as are permissible by the subjoined claims may be resorted to without departing from the spirit of my invention.

Having thus fully described my invention, what I claim and desire to secure by Letters Patent is:

1. The combination with a main axle, an arcuate track thereon, and a subordinate axle pivoted to the main axle, of a pintle, a roller rotatably mounted on the pintle and contacting with the track, and means adjustably mounted in the subordinate axle and having the pintle journaled therein whereby to adjust the roller when either the roller or the track has become worn.

2. The combination with a main axle, an arcuate track thereon, and a subordinate axle pivoted to the main axle, of blocks slidably mounted adjacent the inner end of the subordinate axle, a roller rotatably associated with the blocks and contacting with the track, and bolts adjustably engageable in the subordinate axle and associated with the blocks for adjusting the blocks when either the roller or the track has become worn.

FRANK JAMES BALLWEG.

Witnesses:
C. T. GORDY,
JOHN RENTH.

Copies of this patent may be obtained for five cents each, by addressing the "Commissioner of Patents, Washington, D. C."